Feb. 7, 1933.  H. J. KERR  1,896,176
TUBE SUPPORT
Filed Nov. 8, 1929   5 Sheets-Sheet 1
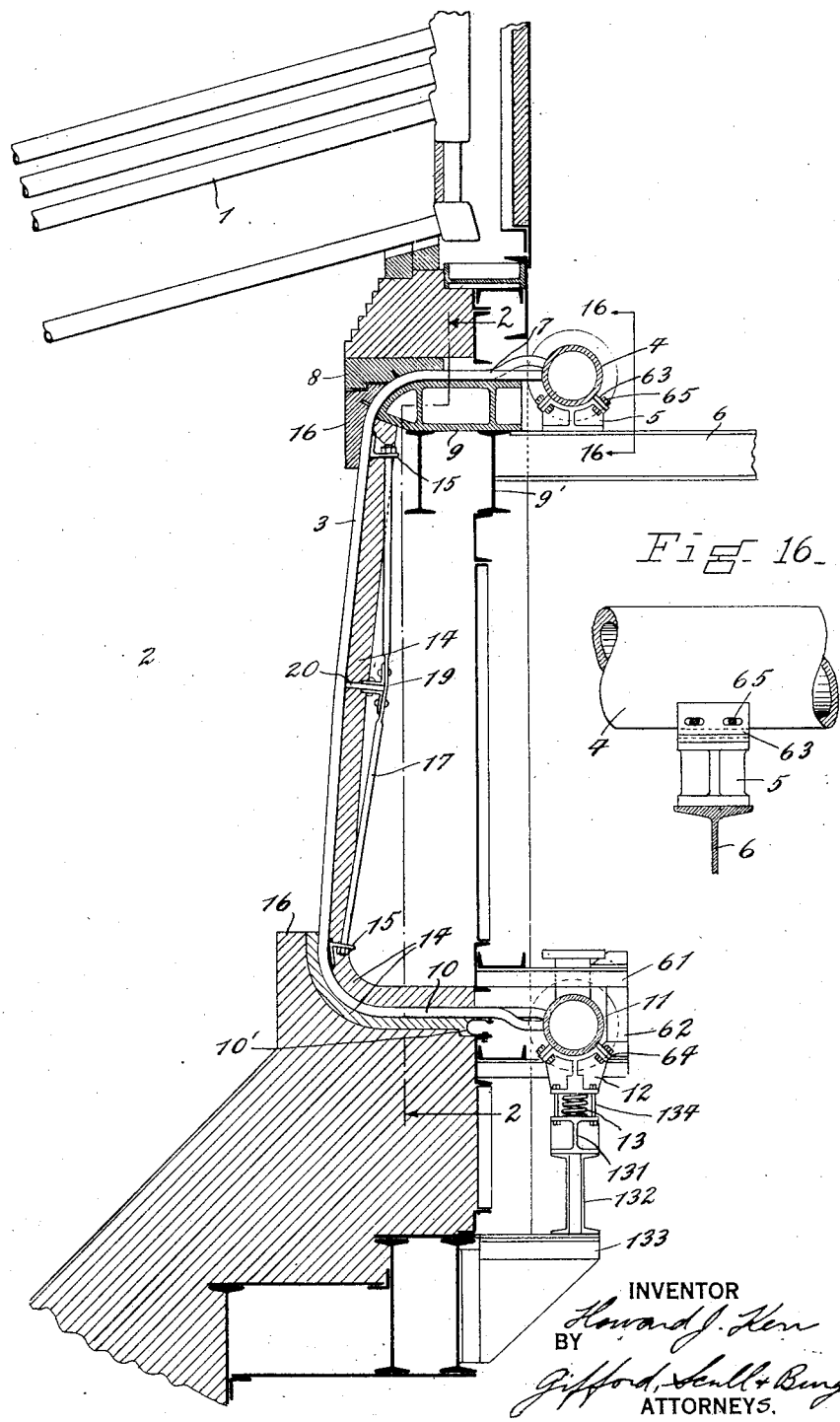

Feb. 7, 1933.    H. J. KERR    1,896,176
TUBE SUPPORT
Filed Nov. 8, 1929    5 Sheets-Sheet 2
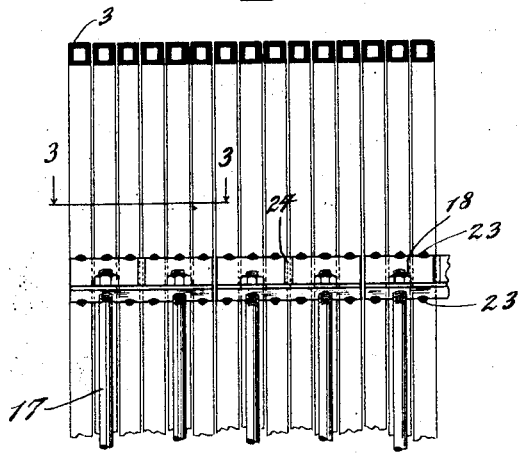
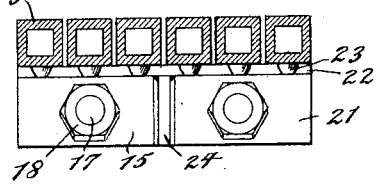
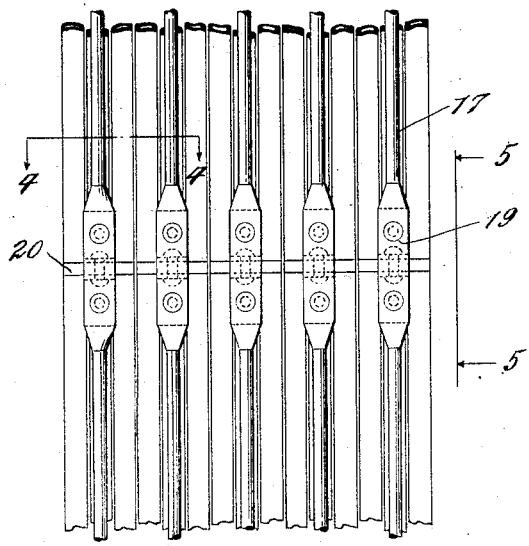
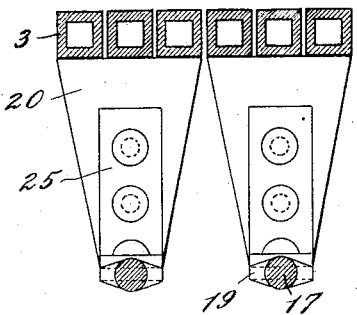
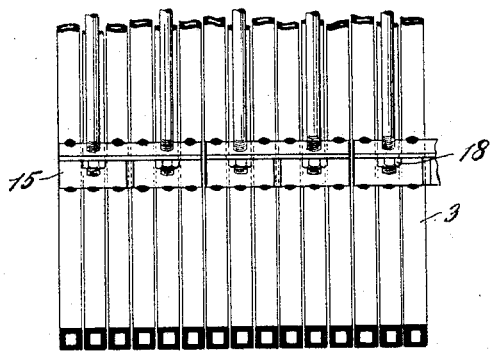
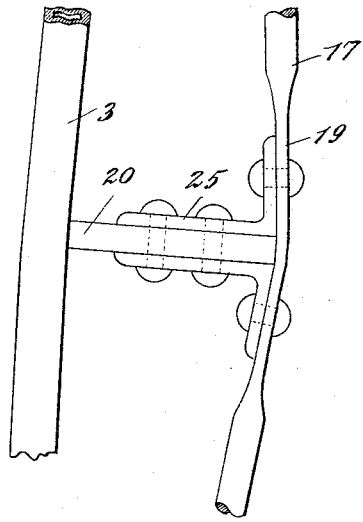
INVENTOR
Howard J. Kerr
BY
Gifford, Scull & Burgess
ATTORNEYS.

Feb. 7, 1933. H. J. KERR 1,896,176
TUBE SUPPORT
Filed Nov. 8, 1929 5 Sheets-Sheet 3
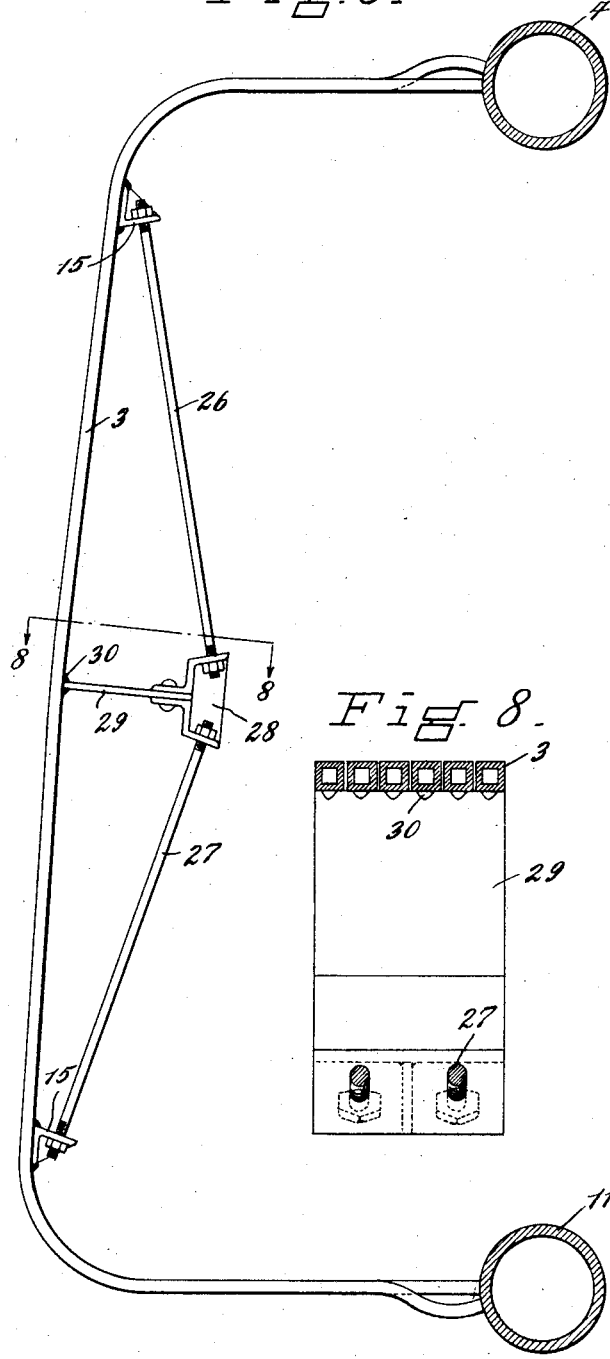
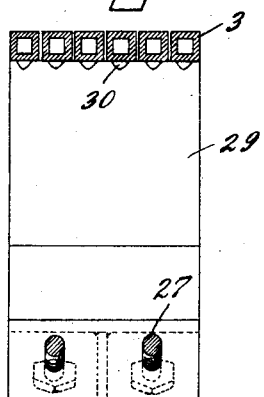
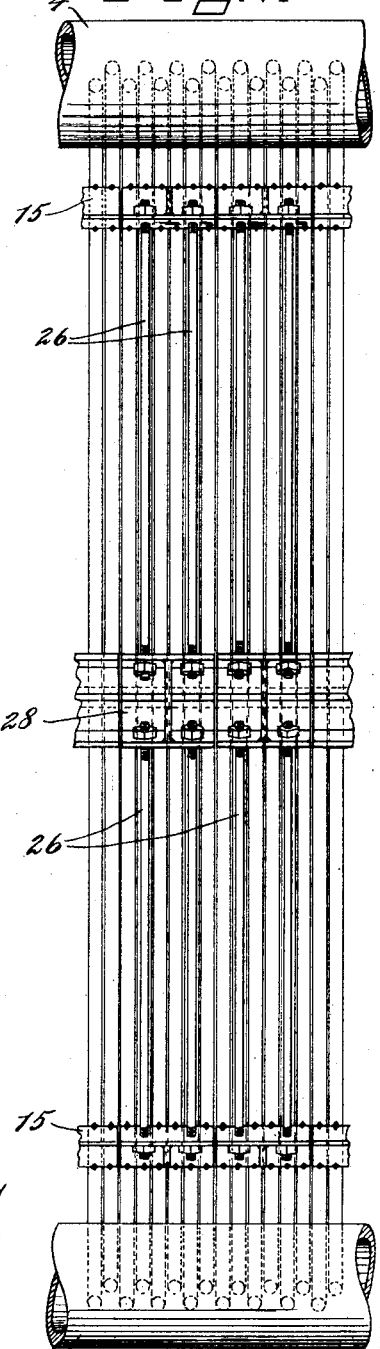
INVENTOR
Howard J. Kerr
BY
Gifford, Scull & Burgess
ATTORNEYS Feb. 7, 1933.  H. J. KERR  1,896,176
TUBE SUPPORT
Filed Nov. 8, 1929  5 Sheets-Sheet 4
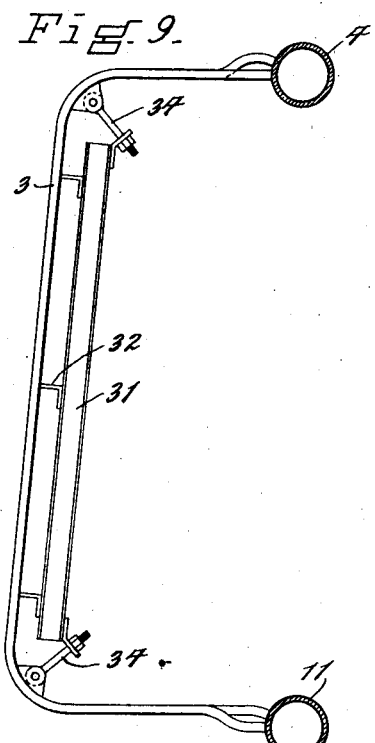
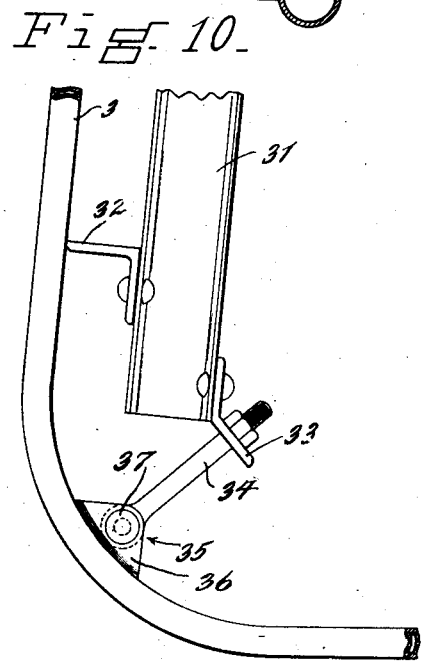
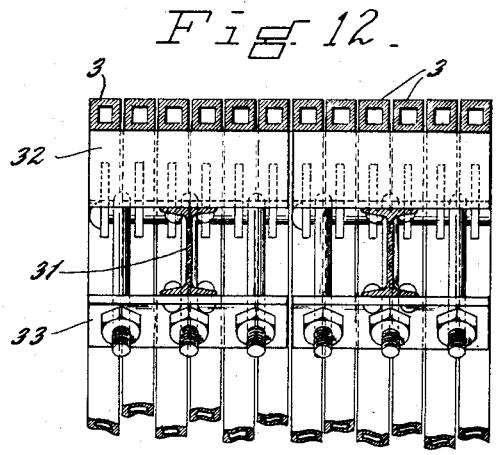
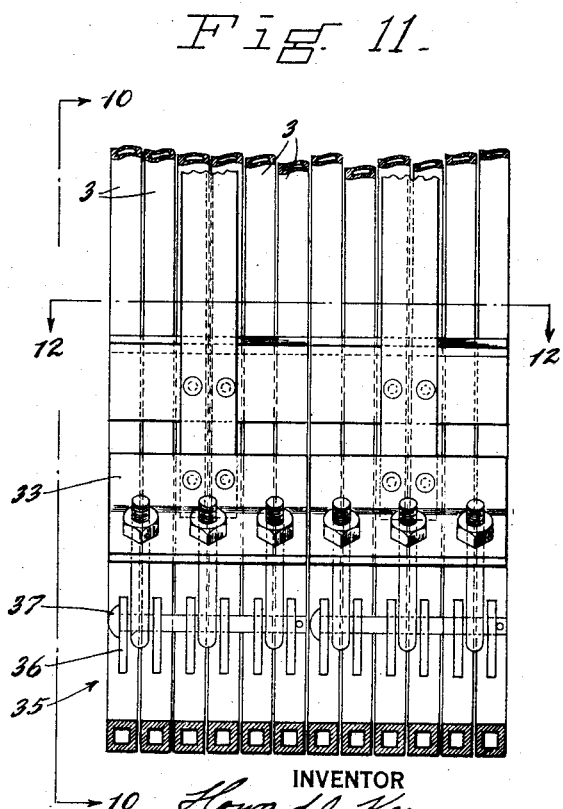
INVENTOR
Howard J. Kerr
BY
Gifford, Scull & Burgess
ATTORNEYS.

Feb. 7, 1933.                H. J. KERR                1,896,176
                            TUBE SUPPORT
                     Filed Nov. 8, 1929        5 Sheets-Sheet 5
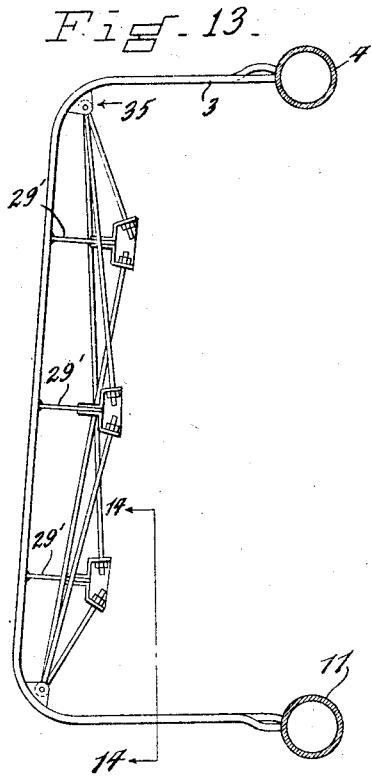
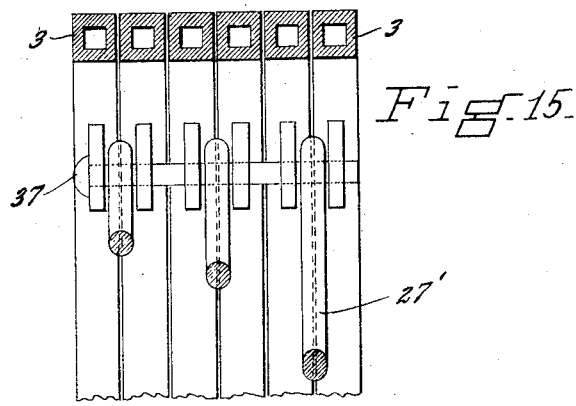
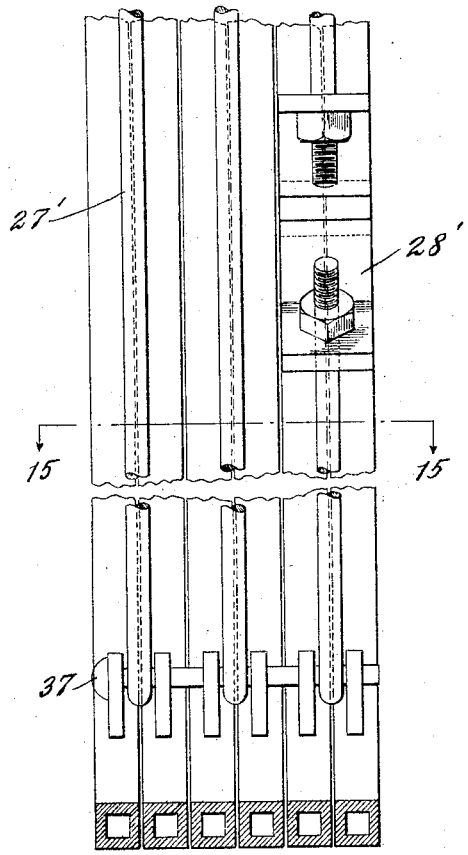
INVENTOR
Howard J. Kerr
BY
Gifford, Scull & Burgess
ATTORNEYS.

Patented Feb. 7, 1933

1,896,176

UNITED STATES PATENT OFFICE

HOWARD J. KERR, OF WESTFIELD, NEW JERSEY, ASSIGNOR TO THE BABCOCK & WILCOX COMPANY, OF BAYONNE, NEW JERSEY, A CORPORATION OF NEW JERSEY

TUBE SUPPORT

Application filed November 8, 1929. Serial No. 405,608.

This invention relates to a novel and improved means for supporting tubes which are subjected to the heat of the furnace, and more particularly for preventing distortion thereof. The invention will be best understood from the following description and the annexed drawings, in which I have shown selected embodiments of the invention and in which:

Fig. 1 is a vertical sectional view through a portion of a furnace and boiler having the invention embodied therein.

Fig. 2 is a view on the line 2—2 of Fig. 1, taken on a larger scale.

Fig. 3 is a section on the line 3—3 of Fig. 2.

Fig. 4 is a section on the line 4—4 of Fig. 2.

Fig. 5 is a view on the line 5—5 of Fig. 2.

Fig. 6 is a view on an enlarged scale illustrating another form which the invention may take, this view corresponding in position to Fig. 1.

Fig. 7 is a view taken from the right of Fig. 6.

Fig. 8 is a section on the line 8—8 of Fig. 6.

Fig. 9 is a view corresponding to Fig. 6, and showing still another form which the invention may take.

Fig. 10 is a fragmentary view on an enlarged scale showing the lower part of Fig. 9, this view being taken on the line 10—10 of Fig. 11.

Fig. 11 is a view taken from the right of Fig. 10.

Fig. 12 is a section on the line 12—12 of Fig. 11.

Fig. 13 is a view corresponding to Figs. 6 and 9., but showing still another form which the invention may take.

Fig. 14 is a view on the line 14—14 of Fig. 13.

Fig. 15 is a section on the line 15—15 of Fig. 14.

Fig. 16 is a view on the line 16—16 of Fig. 1.

Referring first to Figs. 1 to 5 inclusive, the invention is shown as employed in connection with a radiant heat superheater used in connection with a boiler, some of the tubes of which are shown at 1. The combustion chamber of the furnace is shown beneath the tubes at 2, and in one of the walls of the furnace is disposed a radiant heat superheater here shown as formed of a plurality of rectangular tubes 3 disposed in a row in the wall and in position to receive radiant heat from the furnace. The upper ends of the tubes are bent outwardly and extend through the wall, and are there connected to a header 4 supported against vertical movement on a saddle 5 carried by a structural member 6. The outwardly bent ends 7 of the tubes are disposed between members 8 and 9, the member 9 being rigidly secured in position in the wall by being secured to structural members 9'. The member 9 engages all of the tubes, which are thus suspended therefrom. The lower ends 10 of the tubes are likewise bent outwardly and extend through the wall and are there connected to a header 11 supported on a saddle 12 which, in turn, is resiliently supported by a spring support 13. Suitable heat insulating material 14 may be disposed around the ends 10 of the tubes and over the back of the tubes, as plainly shown in Fig. 1, this material being omitted from Fig. 2 for the sake of clearness. A suitable flexible seal may be provided as by a spring plate 10'. This plate and the material 14 are of such character as to permit movement of the tubes.

The tubes are preferably bent inwardly, as plainly shown in Fig. 1, giving them an initial set. When the tubes are heated and expand, they tend to bend, and this initial set will cause this bending tendency to be exerted inwardly towards the furnace, instead of outwardly away from it. I preferably permit this bending to take place inwardly, but prevent its taking place outwardly. The preventing means may consist of a plurality of trusses and I preferably divide the tubes into groups, each group in this case being shown as comprising six tubes. The tubes of each group are connected by abutments here shown as cross-pieces 15, these cross-pieces being disposed at points remote from each other and beyond the part of the tubes which is exposed to radiant heat of the furnace. As plainly shown in Fig. 1, each of the cross-pieces 15 is disposed behind refractory material 16, so as to be protected from the heat of the furnace.

Connecting each pair of cross-pieces are tension members 17 here shown as rods having threaded ends provided with nuts 18 by means of which the amount of tension may be varied by adjustment of the members. The tension member near its center is flattened, as indicated at 19, and riveted to the strut 20. The cross-pieces are shown as being formed of angles having horizontally extending legs 21 through which pass the ends of the tension members, and vertically extending legs 22 which contact with the backs or outer parts of the tubes and which may be welded thereto as indicated at 23. The legs may be connected by a reinforcing web 24, if desired.

The struts 20 are shown in Figs. 4 and 5 as being in the form of plates secured to the flattened portions of the tension members by angles 25. For the sake of illustration, I have shown the cross-pieces as connected to a group of six tubes, and I have shown two tension members for each pair of cross-pieces, with each strut engaging three of the tubes. Of course, it will be understood that this arrangement may be varied, as found desirable.

With the above arrangement, the parts of the tubes which are exposed to the radiant heat in the furnace are left free to expand inwardly as they become heated. Their tendency to bend inwardly rather than outwardly, is increased by their convexity, formed in this instance by the initial set of the tubes. This set may either be a permanent bending of the tubes or may be given by springing the tubes. Preferably, the struts 20 are not connected to the tubes so that the tubes may move freely inwardly away from the struts, but outward movement is prevented by the struts, no matter how the initial set is obtained.

Referring now to Figs. 6, 7 and 8, I have shown therein a modified form in which the tension member is made of two rods 26 and 27 having threaded ends passing through holes in cross-pieces 15 and in a member 28 secured to the strut 29. The ends of these rods are provided with nuts, as shown, but are not threaded in the holes in members 15 and 28. With this arrangement, all the tubes can move freely inwardly, while the rods are free to slide in the members 15 and 28. In this form the struts are shown as welded to the tubes at 30, although as now advised, I do not consider this form as preferable as the form previously described.

In Figs. 9 to 12 inclusive, I have shown a different form of tension member, this form comprising a vertically extending I-beam 31 provided on its inner face with angles having inwardly extending legs 32 which loosely engage the outer faces of the tubes. Adjacent each end, the I-beam is provided with a connection 33 in the form of a plate through which pass bolts 34 pivoted to a bracket 35 which may be welded to the tubes of a group. This bracket is in the form of a plurality of ears 36 having their edges welded to the tubes and receiving a pivot 37 passing through openings therein. The bracket and pivot thus form a cross-piece connecting together the tubes in a group.

In Figs. 13, 14 and 15, I have shown cross-pieces of the form just described in connection with Figs. 9, 10, 11 and 12, but in this arrangement the pivot 37 is connected directly to the ends of the tension members. The tension members are of the general form shown in Figs. 6, 7, and 8, but I provide a plurality thereof with the struts 29' contacting with the outer parts of the tubes at spaced intervals. The corresponding parts of the tension members are designated 27' and 28' and, in this form, I have shown the struts as welded to the outer parts of the tubes at 30'.

Headers 4 and 11, into which the outwardly bent tube ends 7 and 10 are secured, are fixed by supports 5, 6, 61 and 62 against transverse displacement but are provided with slotted lugs 63 and 64 that will permit the headers limited longitudinal movement to compensate for their expansion, by heat. These lugs receive in their slots bolts 65 which serve to hold the lugs against the supports. See Figs. 1 and 16. In addition to provisions for longitudinal movement, header 11 is arranged so that it can have limited vertical movement, all so that the outwardly bent ends of tubes 10 do not have to support the weight of the header and its fittings; this is accomplished by providing springs or resilient members 13, secured in position by supports 12, structural supports 131, 132 and 133; and adjustable guides 134.

In convection superheating it is important to keep the metal temperature down as the superheat goes up. The only solution to this problem is to control or affect the film resistance. This type of resistance outside is high and on the inside it is low. The solution to this problem is to provide high velocity steam flow and a low velocity gas flow. A high temperature drop in the gas film is desirable. Other temperature drops may be low.

Radiant superheaters perform differently. In connection with the operation of such superheaters there is no gas film resistance. Most of the resistance is in the metal.

In radiant superheating of steam metal temperature is necessarily high. Also, there is a greater differential in temperature across the metal. Another consideration of this type of superheating is that the temperature of the back of the metal wall, or that portion of the wall most remote from the burning fuel, is relatively low, whereas the front portion of the wall is relatively hot. This condition pertains in radiant superheating to a much higher degree than it does in convection superheating. The temperature of the back part of the metal wall is, generally speaking, controlled by the steam temperature.

Under the conditions enumerated immediately above, the tubes of a radiantly heated steam superheater tend to bend. Again, the front wall tends to bow independently of the back wall. This is due to the temperature differential. This action imparts a permanent stretch to the rear wall and this permanent stretch has a tendency to result in a reverse bowing of the superheater tube when that tube is cold. This action may prevent a rebowing of the tube to such a position as that indicated in the drawings of this application.

Under these conditions, when the superheater is again put into use, the tendency will be towards unequal bowing of the tubes, this, unless corrected, has a tendency to result in the disruption of the entire superheater wall formed by the tubes.

With regard to the specific modification indicated in this case, the superheater tubes are free to bow inwardly of the furnace. Any action resulting from the tendency of the tubes to become bowed in a direction opposite to the bowing indicated in Fig. 1 of the drawings is limited by the stop 20.

I claim:—

1. In combination, a furnace wall having therein a row of tubes subjected to the heat of the furnace, means preventing said tubes from moving outwardly from the furnace while permitting their movement inwardly under the action of said heat, headers connected to the opposite ends of said tubes, means rigidly supporting one of said headers, and means resiliently supporting the other header.

2. In combination, a furnace wall having therein a row of tubes subjected to the heat of the furnace, said row being divided into a plurality of relatively movable groups, and means connected to the tubes of a group and forming therewith a truss.

3. In combination, a furnace wall having therein a row of tubes subjected to the heat of the furnace, said row being divided into a plurality of groups, cross-pieces secured to the outer side of the tubes of a group at points remote from each other, a tension member connecting said cross-pieces, and a strut disposed between said tension member and the tubes of the group.

4. In combination, a furnace wall having therein a row of tubes subjected to the heat of the furnace, said row being divided into a plurality of groups, cross-pieces secured to the outer side of the tubes of a group at points remote from each other, a tension member connecting said cross-pieces, and a strut disposed between said tension member and the tubes of the group, said strut having one end secured to said tension member and the other end loosely engaging said tubes.

5. In combination, a furnace wall having therein a row of tubes subjected to the heat of the furnace, said row being divided into a plurality of groups, cross-pieces secured to the outer side of the tubes of a group at points remote from each other, a tension member connecting said cross-pieces, a strut disposed between said tension member and the tubes of the group, and means for adjusting said tension member to vary the stress taken thereby.

6. In combination, a furnace wall having therein a row of tubes subjected to the heat of the furnace, said row being divided into a plurality of groups, cross-pieces secured to the outer side of the tubes of a group at points remote from each other, a tension member connecting said cross-pieces, and a strut disposed between said tension member and the tubes of the group, said tubes being initially bent inwardly towards the furnace.

7. In combination, a furnace wall having therein a row of tubes subjected to the heat of the furnace, said row being divided into a plurality of groups, cross-pieces secured to the outer side of the tubes of a group at points remote from each other, a tension member connecting said cross-pieces, and a strut disposed between said tension member and the tubes of the group, said strut having one end secured to said tension member and the other end loosely engaging said tubes, said tubes being initially bent inwardly towards the furnace.

8. In combination, a furnace wall having therein a row of tubes subjected to the heat of the furnace, said row being divided into a plurality of groups, cross-pieces secured to the outer side of the tubes of a group at points remote from each other, a tension member connecting said cross-pieces, a strut disposed between said tension member and the tubes of the group, and refractory material disposed between said cross-pieces and the furnace.

9. In combination, a source of heat, a steam superheater comprising a plurality of tubes having outwardly extending ends and having portions of their lengths exposed to said source of heat, said exposed portions lying in a surface convex toward said source, means to maintain said convexity, said means comprising a strut intermediate the ends of said exposed portions, abutments disposed adjacent the ends of said exposed portions, and tension members connecting said strut and abutments.

10. In combination, a source of heat, a steam superheater comprising a plurality of tubes having outwardly extending ends and having portions of their lengths exposed to said source of heat, said exposed portions lying in a surface convex toward said source, means to maintain said convexity, said means comprising a strut intermediate the ends of said exposed portions, abutments disposed adjacent said tubes beyond said exposed portions, and tension members connecting said strut and abutments.

11. In combination, a source of heat, a steam superheater comprising a plurality of tubes having outwardly extending ends and having portions of their lengths exposed to said source of heat, said exposed portions lying in a surface convex toward said source, means to maintain said convexity, said means comprising members connected to said tubes and forming therewith a truss.

12. A radiantly heated steam superheater comprising, in combination, a furnace wall including a row of steam conducting tubes subjected to the heat of the furnace, refractory material acting as a part of the wall externally of the row of tubes and in contact therewith in their initial positions, said tubes being initially bent inwardly towards the furnace over their exposed portions, and means preventing the tubes from moving outwardly beyond their initial position while permitting further bending inwardly.

13. A radiantly heated steam superheater comprising, in combination, a furnace wall including a row of tubes conducting steam past burning fuel and subjected to the heat of the furnace, and means including a transverse stop contacting with the tubes intermediate their lengths for preventing movement of said tubes transversely to the row in one direction while permitting said movement in the opposite direction under the action of said heat, the tubes of the row being initially bowed toward the fire over their exposed portions and shielded from radiant heat on their sides remote from the burning fuel so that those sides tend to have a much lower temperature than the opposite sides.

14. A radiantly heated steam superheater comprising, in combination, a furnace wall including a row of tubes conducting steam past burning fuel and subjected to the heat of the furnace, and means including transversely arranged stops positioned intermediate the lengths of the tubes for preventing movement of said tubes transversely to the row in a direction outwardly of the furnace beyond certain limits while permitting said movement in a direction toward the center of the furnace under the action of said heat, the tubes of the row being initially bowed toward the fire over their exposed portions and shielded from radiant heat on their sides remote from the burning fuel so that those sides tend to have a much lower temperature than the opposite sides.

15. A steam superheater heated mainly by radiantly transmitted heat and comprising, in combination, a furnace, a row of tubes conducting steam along a wall of the furnace and exposed to heat from the burning fuel whereby the metal temperature of the tubes varies with the quantity of heat absorbed by the steam and with the intensity of fuel combustion in the furnace, and stop means positioned intermediate the ends of the tubes and preventing movement of the tubes outwardly of the furnace and transversely of the row beyond a certain limit while permitting movement of the tubes in the opposite direction and transversely of the row under the influence of combustion in the furnace, the tubes being initially bent inwardly toward the furnace center.

16. A radiantly heated steam superheater comprising, in combination, a furnace; a row of tubes conducting steam along a wall of the furnace and exposed to heat radiantly transmitted from the burning fuel whereby the metal temperature of the tubes varies with the quantity of heat absorbed by the steam and/or with the intensity of fuel combustion in the furnace, said tubes being free to move inwardly of the furnace from their initial positions; and means positioned intermediate the ends of the tubes for preventing the tubes from moving outwardly of the furnace beyond their initial positions, the tubes being initially bent inwardly toward the furnace center.

HOWARD J. KERR.